United States Patent [19]

Berkovich

[11] Patent Number: 5,095,481
[45] Date of Patent: Mar. 10, 1992

[54] TECHNIQUE FOR ACTIVE SYNCHRONIZATION OF THE CONTENT INDUCED TRANSACTION OVERLAP (CITO) COMMUNICATION CHANNEL

[75] Inventor: Semyon Berkovich, Rockville, Md.

[73] Assignee: Allied-Signal Inc., Morris Township, Morris County, N.J.

[21] Appl. No.: 350,968

[22] Filed: May 12, 1989

[51] Int. Cl.⁵ .................... H04J 3/06; H04J 3/12
[52] U.S. Cl. .................. 370/100.1; 370/110.1; 375/107
[58] Field of Search ............ 370/100.1, 85.1, 103, 370/109, 110.4, 118, 119, 105.4; 375/106, 107, 114, 116, 122, 121

[56] References Cited

U.S. PATENT DOCUMENTS

| 4,493,074 | 1/1985 | Walter et al. ................ 370/119 |
| 4,598,411 | 7/1986 | Berkovich et al. ............ 370/118 |
| 4,803,702 | 2/1989 | Chen et al. ................ 370/100.1 |
| 4,855,997 | 8/1989 | Wilson et al. ............... 370/85.1 |

*Primary Examiner*—Benedict V. Safourek
*Assistant Examiner*—Wellington Chin
*Attorney, Agent, or Firm*—Donald B. Paschburg; Howard G. Massung; Robert A. Walsh

[57] ABSTRACT

A simple mechanism for a CITO communication channel with a possibility to use variable length messages which combines different control functions; bootstrapping, synchronization, and interrupts is disclosed. The mechanism introduces and maintains synchronization of the CITO communication channel by actively interrupting and restarting the transmission process.

10 Claims, 3 Drawing Sheets

TECHNIQUE FOR ACTIVE SYNCHRONIZATION OF THE CONTENT INDUCED TRANSACTION OVERLAP (CITO) COMMUNICATION CHANNEL

BACKGROUND OF THE INVENTION

1. Field of the Invention

The invention is related to the field of computer communications and more particularly to achieving synchronization of a Content Induced Transaction Overlap (CITO) communication channel.

2. Description of the Prior Art

Various types of multiple-access channel communication systems are known in the art. These communication systems may conveniently be divided into two distinct types, the Time Division Multiple Access (TDMA) systems, and the Carrier Sensed Multiple Access (CSMA) systems. In time Division Multiple Access systems, such as disclosed by Hopkins et al in U.S. Pat. No. 4,161,786; Lowe, Jr. in U.S. Pat. No. 4,199,662 or White et al in U.S. Pat. No. 4,199,661 the transmission channel capacity is divided into time slots during which identified transmitters are allowed to transmit their information over the communication network. Each transmitter is assigned a specific time slot so that each transmitter in turn will have an opportunity to transmit its information. In Carrier Sensed Multiple Access systems, such as disclosed by Eswaran et al in U.S. Pat. No. 4,292,623, Herzog, U.S. Pat. No. 4,199,663, or Spracklen et al in U.S. Pat. No. 4,337,465, each transmitter detects when the communication channel is idle, then after a predetermined period of time, attempts to transmit its information. Typically, the waiting period depends on the assigned priority of the transmitter.

The problem with the Time Division Multiple Access system is that often a particular transmitter may not have any information to transmit during its allotted time slot, while other transmitters may generate two or more messages in the period between their allotted time slots. Therefore some transmission time slots are wasted while other messages are delayed while awaiting access to the common transmission line. This problem is partially overcome by the Carrier Sensed Multiple Access system under light or moderate loads. However under high message traffic conditions, the probability of simultaneous access to the common transmission line rises sharply, and excessive amounts of time are wasted resolving priority differences of the involved transmitters.

A Content Induced Transaction Overlap Communication System (CITO) as disclosed by Walter et al in U.S. Pat. No. 4,493,074 and assigned to the same assignee as the present invention is hereby incorporated by reference and, is designed to overcome these problems. Such a system is designed for transmitting data from a plurality of senders to a receiver over a single communication channel. Each sender has a data register which stores the multiple bit data word to be transmitted, a word boundary register which stores the number of bits in the data word and a bit position register. The transmission begins with each sender transmitting the highest order bit stored in the data register. Bits are transmitted on the channel in an overlapped manner such that the channel state is the logical sum or product of the transmitted bits. Using single phase representation, where a zero bit is transmitted as a finite signal level and a one bit is transmitted as a null signal level, the composite channel states are accordingly 0 or 1.

The senders each then compare the state of the communication channel with their transmitted bit to determine if they are the same. If the state of the communication channel is the same as the transmitted bit, the sender transmits its next highest bit and decrements its word boundary and bit position registers. However, if the state of the communication channel is different from its transmitted bit, the sender terminates the transmission of its remaining bits but continues to monitor the communication channel and decrement its word boundary register for each bit transmitted on the communication channel. At the end of the transmission of the data word, indicated by the word boundary register being decremented to zero, each sender enters into bit competition with all of the senders based on the content of its bit position register when it stopped transmitting to determine if it has lexicographically the next smallest data word. If it has, it initiates the sending of its remaining data bits. However, if it doesn't have lexicographically the next smallest data word, the sender waits until the end of the transmission of the current data word and re-enters the bit competition. This cycle repeats until all of the senders have completed the transmission of all the bits in their data words. At this point, all the bit position registers have zero bits and no sender performs in the bit competition. The senders recognize the termination of the current data bucket (collection of data bits in the different senders) and the transmission of the next data bucket can begin after synchronization.

The problem of achieving synchronization in CITO communication arises because the transmission framework contains bits of different meanings: bit competitions or word fragments. A device reviewing a CITO transmission has to be able to recognize the boundaries between these types of messages. This problem appears throughout A CITO channel's full cycle of operation: when the system initializes (bootstrapping), when a new device starts transmitting on the communication channel (dynamic attachment), and when a device fails and has to resynchronize.

The prior art's solutions for synchronization of multi-access communication channels, which do not have specially reserved states different from information carrying signals, is to employ a unique synchronization pattern. As soon as the transmission pattern is different from any possible combination of symbols which appear in the course of regular transmission, a reference point is provided for a receiving device.

There are two basic approaches to organizing a particular pattern in the CITO channel for the purpose of synchronization. The first approach is to use an inter data bucket "silence" (string of 1's) of a length (r+log r) appearing on the communication channel at the end of the data bucket. The second approach is to introduce bit stuffing by suppressing artificially, strings of "1's", having a length greater than log r, so that a pattern of log r silent slots of "1's", can serve as an indicator of the data bucket's end.

In both of these approaches a device seeking synchronization has to wait until the end of the data bucket. The latter method uses a shorter synchronization pattern but it requires extra hardware that is utilized solely for synchronization purposes.

A variety of other synchronization techniques exist, one of which is disclosed by Whiteside et al in U.S. Pat. No. 4,330,826. This Synchronizer and Synchronization System For Multiple Computer Systems works on the principal of obtaining a "voted sampling number" when a predetermined number of computers send messages containing the same sampling number. In the present invention, the synchronization is achieved through a mechanism of interrupt which can be performed by each of the devices without an agreement protocol. U.S. Pat. No. 4,621,289 by Bart et al discloses an improvement in a television receiver sync filter which represents an attempt to overcome currently existing problems especially in the areas of weak, noisy, and non-standard video signals. The present invention of active synchronization, however, deals mostly with the organizational aspects of the problem and assumes standard environmental digital signals. U.S. Pat. No. 4,720,828 discloses an I/O handler for a computer. This device passes data between the computer and devices external to the computer. Bit synchronization is accomplished by the dedication of one of the several channel intervals to the transmission of a special sync sequence. In the present invention, however, there is no dedicated intervals for synchronization, it can be initiated within a regular transmission at any time interval. U.S. Pat. No. 4,733,353 by Jaswa discloses a frame synchronization method and apparatus for multiply redundant computers. With this invention, each computer periodically executes a frame synchronization procedure in which it sequentially assumes a plurality of different operating states during which it pauses in the execution of a task it was performing readies itself for synchronization and synchronizes itself with one of the other systems. In the present invention, however, the process of synchronization can be performed at arbitrary moments of time and by the initiation of any of the computers in the system. In U.S. Pat. No. 4,323,966 by Whiteside et al, an operations controller for a fault-tolerant multiple computer system is disclosed. This system uses a master-slave concept and the operation controller is utilized for scheduling various tasks. The synchronization is organized by a conventional message passing method which is different than that disclosed in the present invention.

SUMMARY OF THE INVENTION

It is an object of the invention to develop a new simple method for introducing and maintaining synchronization of a CITO communication channel which does not tax any time resources of normal operations. Such a method would be utilized for continuous transmission, without affecting the structure of data buckets.

It is another object of this invention to develop an algorithm which can be utilized for maintaining synchronization as well as initial bootstrapping so that there is no need for extra circuitry.

It is a further object of this invention to develop a method which can be used for fault-tolerance control so that if a device detects a transmission error, it can forcibly resynchronize the communication channel and check whether the detected error is due to the possible loss of synchronization.

These objects are attained in accordance with the present invention by developing a new simple method for introducing and maintaining synchronization of the CITO communication channel which actively interrupts and restarts the transmission process.

This invention suggests a different approach from the typical synchronization techniques discussed above and utilizes the specifics of the CITO protocol. In this invention, a device seeking synchronization actively changes the CITO synchronization frame by sending a string of "0's" long enough to stop all of the various transmissions. Then all of the devices, as well as the new one, restart their communication process. The advantages of such an approach are the following. (1) Using active synchronization techniques does not intervene with the normal channel communication process. (2) Synchronization can be achieved faster since it can take place at any moment. There is no need to wait until the end of a data bucket. (3) The design of the channel communication circuitry is simplified because the synchronization block employs functions which correspond with other control blocks.

DETAILED DESCRIPTION OF THE INVENTION

Figure 1:
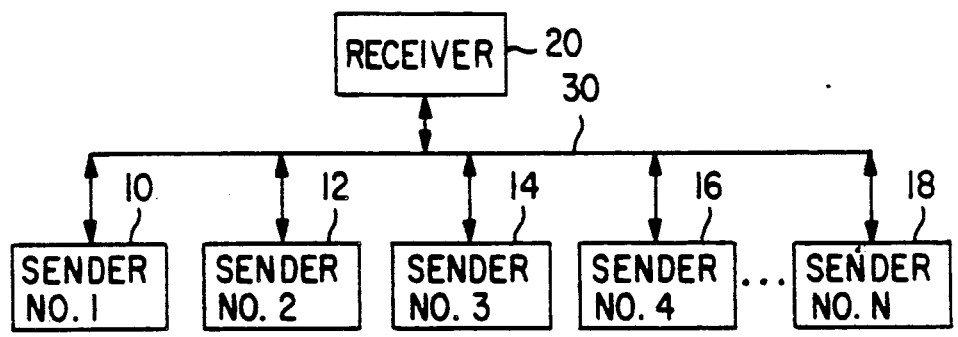
FIG. 1 is a block diagram of a multiple access communication system.

The content induced transaction overlap communication system is intended to solve many of the problems that exist when many transmitters require multiple access to a single communication channel to a common receiver. FIG. 1 is a block diagram of a typical system having multiple Senders 10, 12, 14, 16 and 18 transmitting information to a Receiver 20 over a common communication channel or Bus 30. Each Sender 10, 12, 14, 16 and 18 is capable of randomly sending information which is required by the Receiver 20. The Senders 10, 12, 14, 16 and 18 may represent individual sensors, controls, or other types of inputs, or may be individual microprocessors in a multiple computer system or individual computers in a fault tolerant computer network or any combination of the above. The Receiver may be a utilization device, or master in a multiple computer system, or any other similar device.

Figure 2:
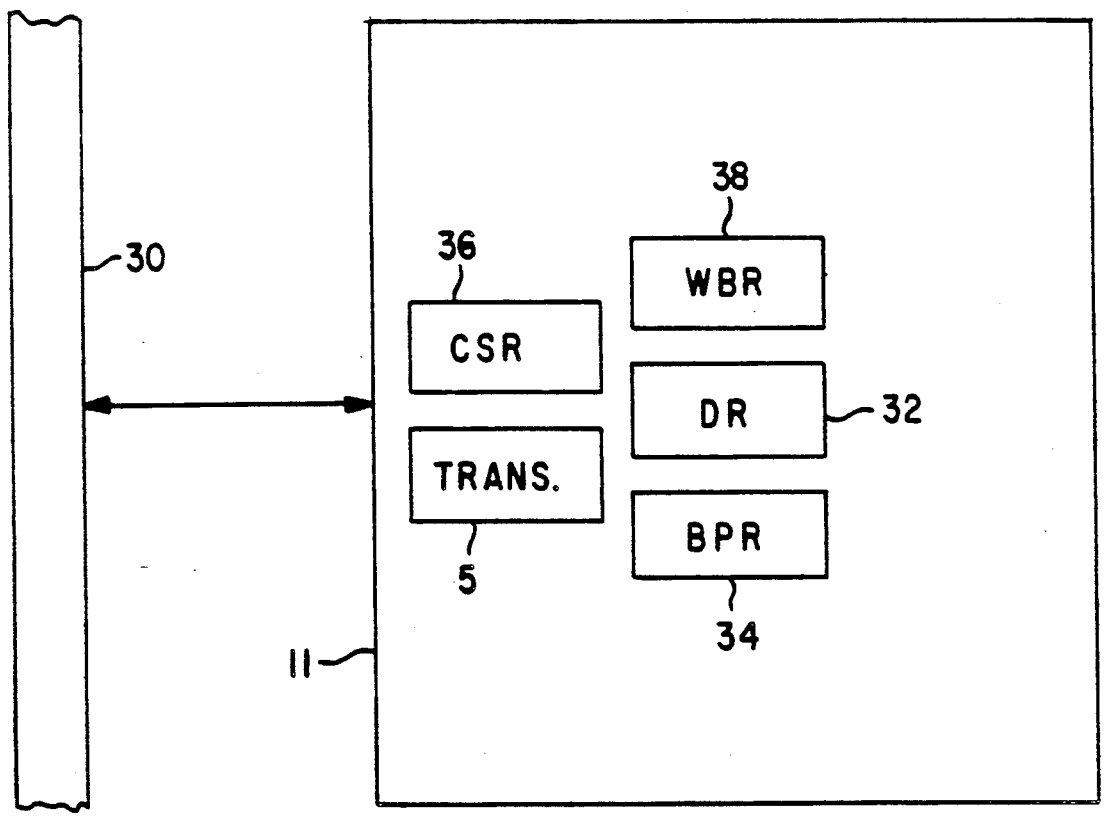
FIG. 2 is a block diagram illustrating the elements of the Sender in a content induced transaction overlap communication system.

From the prior art, as above in FIG. 2, the interface portion 11 of each sender 10, 12, 14, 16 and 18 embodies a data register (DR) 32, a bit position register (BPR) 34 a channel status register (CSR) 36, a word boundary register (WBR) 38 and a transmitter 5. The data register 32 holds the data word to be transmitted to the CITO communication channel 30. The data word is shifted out of the data register 32 to the CITO communication channel 30 one bit at a time in serial fashion. The bit position register 34 is loaded with the number of bits (r) in the data word to be sent after the Sender has synchronized with the channel. It is decremented every time the Sender successfully transmits a data bit. It is also used to determine access privilege to the communication channel. The channel status register 36 is a one bit register which stores the bit value of the last transmission on the communication channel and functions as the receiver portion of the Sender. The word boundry register 38 keeps track of the number of bits that have been sent over the communication channel and is used to determine when a word has been completely transmitted. Until the word is completely transmitted, the word boundary register 38 signals the Sender to attempt to continue its data transmission.

Let us consider a typical content induced transaction overlap channel with n attached Senders. An arbitrary number "m" of the attached Senders have data ready and have multi access to the communication channel. Each Sender is capable of transmitting a single r-bit word. The collection of the r-bit words in the m different senders is called a "data bucket". Other Senders on the communication channel may become ready to transmit during an active data bucket, however, in the past, these Senders had to wait until the current data bucket was completely transmitted. The data of the waiting Senders then became part of the next sequential data bucket. In this invention, however, there is no requirement to wait until the end of a data bucket. Synchronization can take place at any time.

Figure 3:
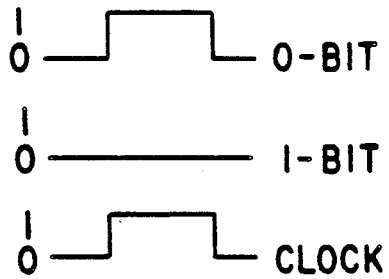
FIG. 3 is a graphical illustration of the 0 bit and 1 bit signals transmitted on the communications channel.

Consider the transmission of a single data bucket. As the data bucket becomes active each Sender's word boundary register 38 and bit position register 34 (FIG. 2) is loaded with the value "r" indicative of the number of bits, in the word to be transmitted. The transmission over the communication channel 30 begins with each of the m Senders simultaneously transmitting their higher order data bit. Those transmitting a "0"-bit, as illustrated in FIG. 3, raise the signal level on the communication channel 30 (FIG. 2) by a finite value. Those transmitting a 1-bit, as illustrated in FIG. 3, leave the signal value on the communication channel unchanged. Each sender listens to the communication channel during this transmission. If the Sender just transmitted a 0 or 1 and senses that the state of the channel is not the same as its transmitted bit, it will decrement only its word boundary register 38 (FIG. 2) and does not transmit its next bit. This Sender however continues to listen to the communication channel and decrements its word boundary register 38 with each bit transmitted by the other Senders.

This procedure is repeated, with Senders dropping out of the transmission as described above, until the first r-bit word is fully transmitted. This word will be lexicographically the smallest. The remaining m-1 Senders will recognize the occurrence of a word boundary by their word boundary registers 38 being decremented to zero. Each of the remaining m-1 Senders begins transmitting again, but it does not transmit a data bit. The Senders instead transmit the high order bit of their respective bit position register 34. This transmission occurs exactly as described above for data. However, as each Sender listens to the current channel, it shifts this bit value into the word boundary register 38. This bit position transmission continues until all the bits of the bit position register 34 have been transmitted. It is obvious that at the end of this activity, called "bit competition" the value which has been shifted into the word boundary register is lexicographically the smallest value present in any of the bit position registers of the remaining Senders. The Senders still needing to transmit data now compare their bit position and word boundary registers. If the two are equal, the Sender immediately begins to transmit the next bit in its data register.

The Senders which win the bit competition are the Senders which have the fewest bits in their data words remaining to be transmitted. There may be only one Sender winning the bit competition but in case of redundancy in the word to be transmitted, it is possible more than one sender can win the bit competition. The Sender which won the bit competition does not resend the "1" it was sending when it terminated transmission. This is due to the fact that the Receiver 20 already knows the value of this bit. In particular, if the Sender or Senders which win the bit competition have only one more bit to send it does not send this bit since its value must be "1".

Data transmission resumes at the termination of the bit competition. Each Sender, whether sending or not, listens to the communication channel's activity and decrements its word boundary register as each bit is transmitted. When the word boundary register 38 reaches a zero value, the next word boundary has occurred and "bit competition" is repeated.

This interleaving of data transmission and bit competition continues until all Senders have successfully completed transmission of their data words. At this point, all the bit position registers 34 are zeros and no Sender performs in the bit competition. Transmission of the next data bucket can begin after synchronization takes place. Synchronization with the communication channel implies that the Sender is able to distinguish word boundaries and bit competitions. Once the Sender is synchronized in this manner, it may enter into data transmission on the communication channel. If the Senders are to be permitted to dynamically attach and detach themselves, it is necessary that they be able to synchronize themselves when they come on line.

Figure 4:
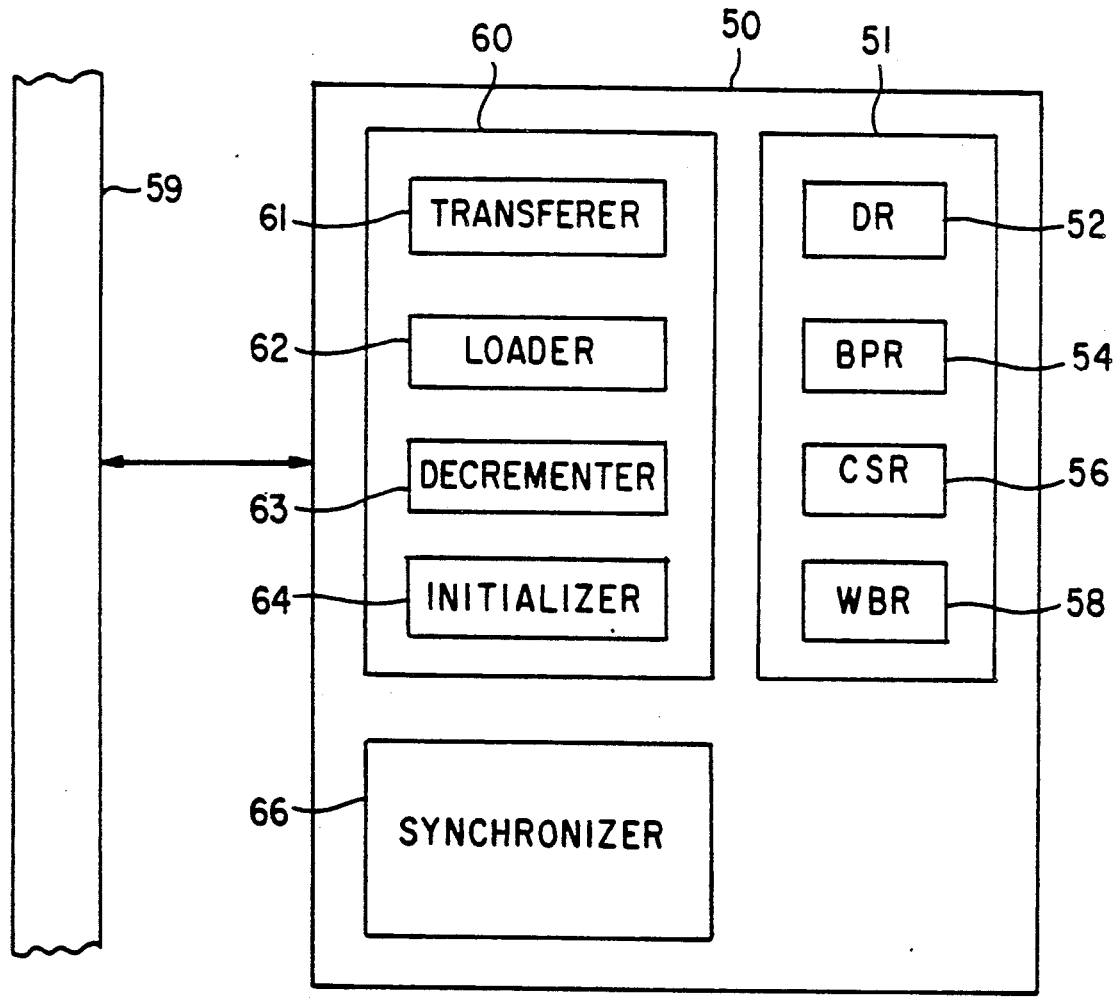
FIG. 4 is a block diagram of the present invention.

FIG. 4 illustrates a block diagram of the present invention. The interface portion 50 of each sender comprises several registers 51, a transmitter 60 and a synchronizer 66. The registers, as discussed in the prior art, include a data register (DR) 52, a bit position register (BPR) 54, a channel status register (CSR) 56 and a word boundary register (WBR) 58. The data register 52 holds the data word to be transmitted to the CITO communication channel 59. The transmitter 60 includes a transferer 61, a loader 62, a decrementer 63 and an initializer 64. Transferer 61 shifts data bits from data register 52 onto communication channel 59 one bit at a time in serial fashion. Loader 62 shifts bits from a data source and loads data register 52 and bit position register 54. Decrementer decreases bits from word boundary register 58 and bit position register 54 so as to signify that the state of the transmitted data bit was the same as the state of communication channel 59. Initializer resets word boundary register 58 and bit position register 54. Synchronizer 66 controls transmitter 60 by generating signals to stop or restart transmission to the CITO communication channel 59.

Synchronizer 66 utilizes the specifics of CITO protocol as discussed in the Description of the Prior Art where reference is made to A Content Induced Transaction Overlap Communication System (CITO), disclosed by Walter et al in U.S. Pat. No. 4,493,074 which is incorporated by reference and assigned to the same assignee as the present invention. The combination of "00 ... 0" is not used in the bit-competitions (BC) and therefore the detection of this combination is an indication of an interrupt or of synchronization.

Figure 5:
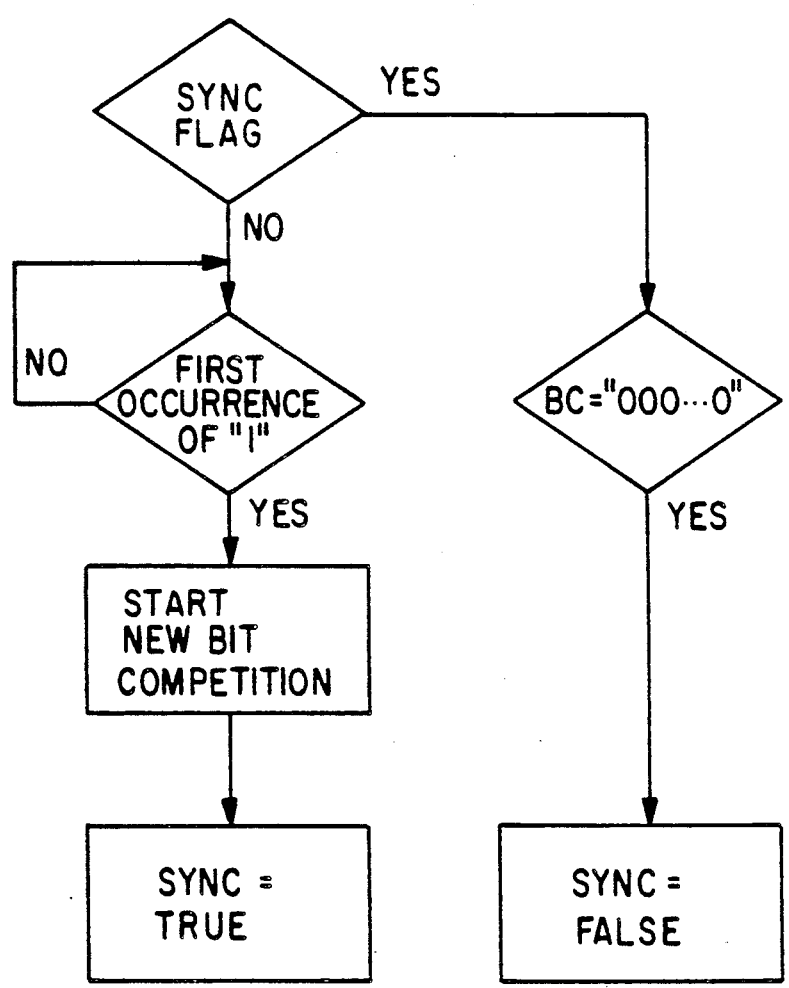
FIG. 5 is a Software Flow diagram of the starting of the synchronization process.

If a senders wants to join the transmission, it sets a SYNCH flag, SYNCH=TRUE, and starts sending at any point a string of "0's" of sufficient length to provide all "0's" in at least one occurrence of a bit-competition. By virtue of the specifics of the CITO protocol, this string of "0's" will simply suspend the activities of the senders participating in the transmission without destroying their messages. Note that all of the devices (including the initiator of synchronization) start the synchronization process with SYNCH=TRUE (the contents of the registers is immaterial), therefore, all of the senders can follow the same simple behavioral rule as illustrated in FIG. 5 and as described below.

```
IF SYNCH THEN test  BC = "00 . . . 0"
                If  BC = "000 . . . 0" THEN
                    SYNCH: = FALSE;
IF NOT-SYNCH THEN   wait for first occurrence of "1"
                    Start New Bit-Competition
                    SYNCH: = TRUE
```

Figure 6:
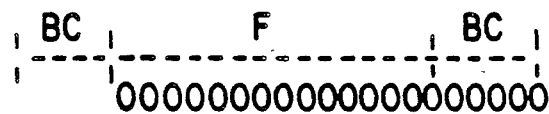
FIG. 6 illustrates a synchronizing string of "0's".

If the length of the string of "0's" sent by the synchronization sender is r+2*log r, it will definitely cover a fragment F and at least one of the adjacent bit competitions. However, the synchronizing string of "0's" may be shorter: r+log r+1. FIG. 6 presents the worst case with the string of "0's" just immediately following the bit-competition therefore if it is of length r+log r it will reach the next bit-competition (the last 1 is for control purposes to distinguish between synchronization and interrupts).

If the string of "0's" is moved right so its head remains within F, it will always cover BC. Now consider what happens if this string is moved to the left so that its head begins within BC. First consider a move of one position to the left. It looks like it will not cover either BC at the left nor BC at the right. However, as soon as the "0's" string is moved to the left it decreases the value of BC which immediately decreases the subsequent F, and the string will also reach the next BC. If it is moved two positions to the left this will cause further decreases in F and so on. The interrupt uses essentially the same mechanism, but since an interrupting device knows the synchronization pattern it does not have to send a long string of "0's". For an interrupt it is sufficient to send only all "0's" in the bit-competition. The end of the string of synchronizing "0's" is recognized by a silence slot "1". The sender then transmits "0" which indicates the beginning of a new transmission pattern.

In the most simple situation a new transmission pattern can start transmission with a new bucket. In this example, synchronization becomes essentially similar to the process of interrupt and bootstrapping.

The functions of the algorithm for the content induced transaction overlap communication systems are preferably implemented by a programmed microprocessor having adequate storage and computation capabilities, such as the 8080A Microprocessor manufactured by Intel Corporation of Santa Clara, Calif., or any other microcomputer or comparable capabilities. However, if desired, the algorithm may be hardware implemented using commercially available integrated circuits and discrete electronic components. It is not intended that the invention be limited to the hardware arrangement, or operational procedures shown disclosed herein. It is believed that those skilled in the art could use coding techniques or modify the procedures shown on the flow diagrams without departing from the spirit of the invention as described herein and set forth in the appended claims.

I claim:

1. A method of synchronizing a content induced transaction overlap communication channel comprising:

transmitting data from a plurality of registers onto said communication channel;
    setting a sync flag in one of a plurality of senders;
    entering a first state in which transmitting data onto said communication channel is halted;
    determining which sender of said plurality of senders have set said sync flag;
    instructing said sender to reset said sync flag; and,
    restarting transmitting data onto said communication channel.

2. A method of synchronizing as defined in claim 1 wherein entering said first state comprises:

sending a string of "0's" of sufficient length to provide all "0's" in at least one occurrence of a bit competition.

3. A method of synchronizing as defined in claim 1 wherein entering said first state comprises:

sending a string of "0's" of the length r+log r.

4. A method of synchronizing as defined in claim 1 wherein entering said first state comprises:

sending a string of "0's" of the length r+2*log r.

5. A method of synchronizing as defined in claim 1 wherein setting a sync flag in a sender comprises:

setting said sync flag to true.

6. A method of synchronizing as defined in claim 1 wherein instructing the sender to reset its sync flag comprises:

resetting said sync flag to false.

7. A synchronized data communication system having a single data communication channel interconnecting a plurality of senders to at least one receiver, wherein each sender comprises:

data register means for storing a multi-bit data word; each data bit of said multi-bit data word having one of two possible states;

word boundry register means for storing a number corresponding to the number of data bits in said multi-bit data word;

bit position register means for storing a number corresponding to the number of bits in said multi-bit data word;

channel status register means for functioning as a receiver portion of said plurality of senders and for storing a bit value of last transmission on said single data communication channel;

transmitter means for transmitting said data bits from said data register means onto said single data communication channel one bit at a time in serial fashion;

means responsive to said single data communication channel assuming the same state as the transmitted data bit for enabling said transmitter means to transmit a next collection of data words; and, synchronizer means for generating a signal to stop all transmission of data and for restarting communication.

8. A synchronized data communication system as defined in claim 7 wherein said sender further comprises:

means for disabling said transmitter means in response to detecting a signal from said synchronizer means or a difference between the state of the transmitted bit and the state of said communication channel, said means for disabling further including means for resetting said signal from said synchronizer means and for decrementing said word boundry register means for each bit transmitted on said single data communication channel; and, bit competition means responsive to said word boundry register means being decremented to 0 for comparing the contents of its bit position register with the contents of the bit position registers in the other senders to enable said transmitter means when the content of its bit position register is indicative of the lexicographically smallest data word remaining to be transmitted.

9. A synchronized data communication system as defined in claim 7 wherein said two possible states are logical states zero and one.

10. A synchronized content induced transaction overlap communication channel interconnecting a plurality of senders to at least one receiver comprising:

at least one data module for transmitting on the communication channel the data received from the data source in a format comprising an interleaved transmission of data bits and bit position bits, said bit position indicative of the number of data bits to be transmitted in the subsequent data bit transmission which are different from the preceding data bit transmission;

data decoder means responsive to the data bits and bit position bits transmitted on the communication channel for reconstructing the data to its original format as generated by the data source; and, wherein said at least one data compression module comprises a plurality of sub-modules, each sub-module comprising:

a plurality of channel status registers for functioning as a receiver portion of said plurality of sub-modules and for storing a bit value of last transmission on said communication channel;

data storage means for temporarily storing data in a plurality of data registers, each data register storing a predetermined segment of the data;

a plurality of bit position registers, one associated with each data register, for storing bit position bits indicative of the number of data bits in its associated data register remaining to be transmitted;

a plurality of word boundary registers connected to the communication channel for storing a number corresponding to the smallest number of data bits in any data register in any sub-module remaining to be transmitted;

means for repeatedly selecting data bits to be transmitted from said plurality of data registers;

means for transmitting said selected data bits on said communication channel one at a time simultaneously; and, synchronizer means for generating a signal to stop all transmission of data and for restarting communication.

* * * * *